Nov. 4, 1947.  S. T. HADDEN  2,430,333
PARAFFIN ALKYLATION IN THE PRESENCE OF HYDROGEN FLUORIDE
Filed June 22, 1945  3 Sheets-Sheet 2
Fig. 2.
Fig. 3.
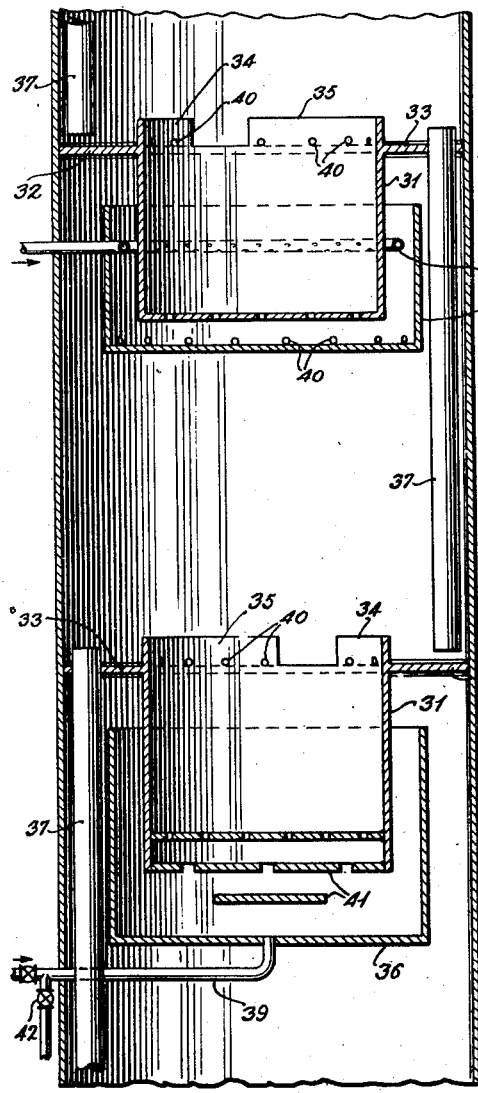
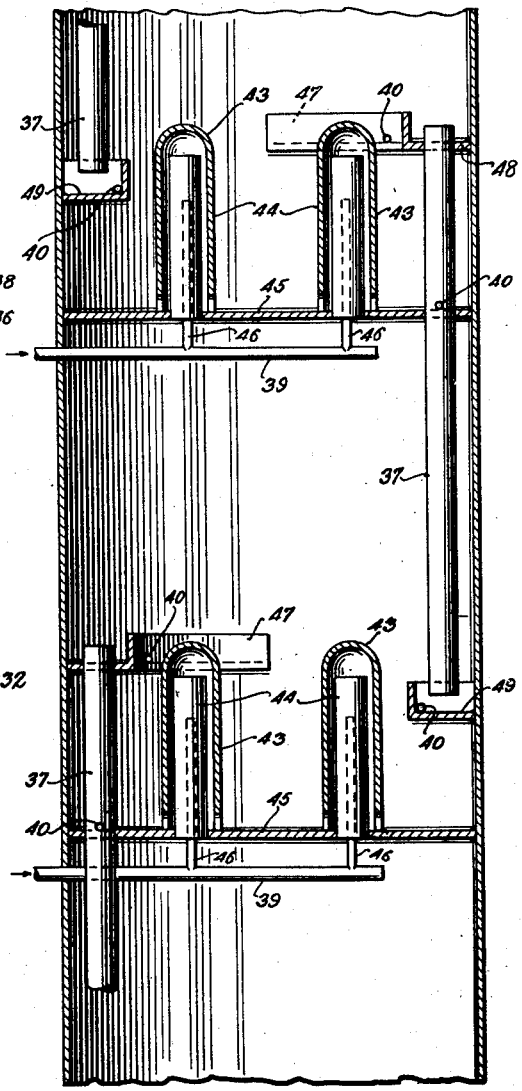
INVENTOR
Stuart T. Hadden
BY
ATTORNEY Nov. 4, 1947.  S. T. HADDEN  2,430,333
PARAFFIN ALKYLATION IN THE PRESENCE OF HYDROGEN FLUORIDE
Filed June 22, 1945  3 Sheets-Sheet 3
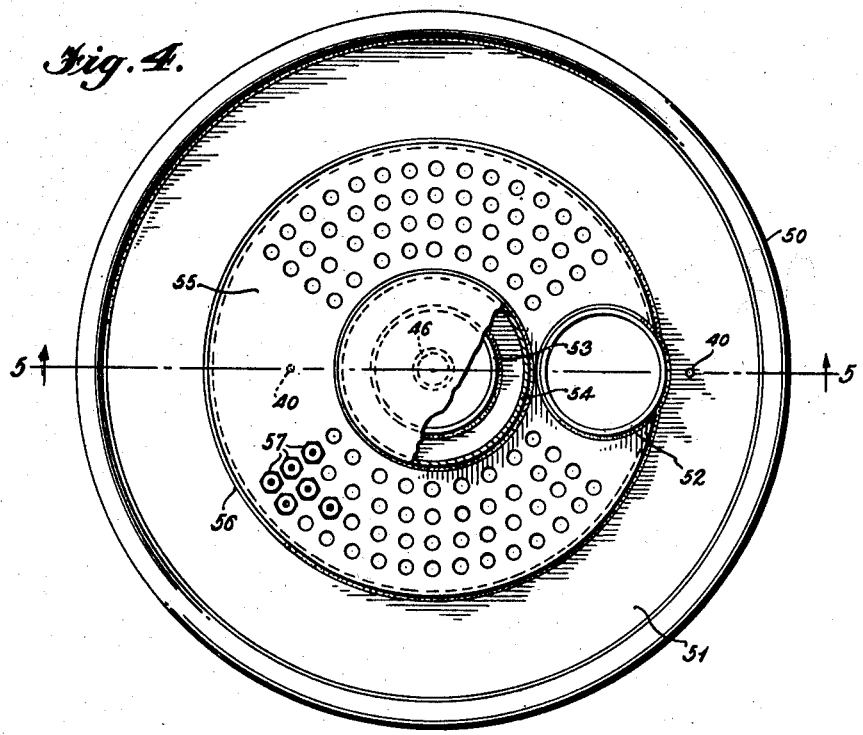
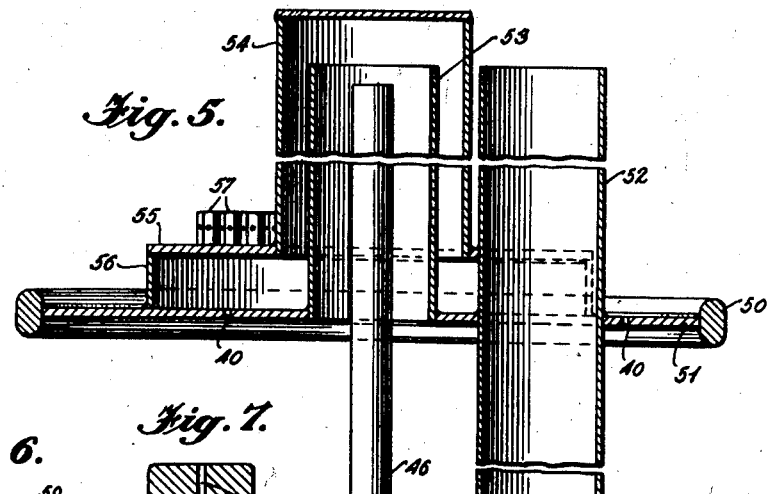
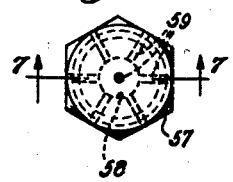 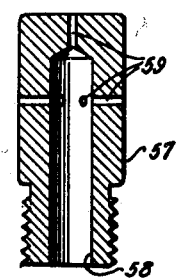
INVENTOR
Stuart T. Hadden
BY
Oswald G. Hayes
ATTORNEY Patented Nov. 4, 1947

2,430,333

UNITED STATES PATENT OFFICE 2,430,333

PARAFFIN ALKYLATION IN THE PRESENCE OF HYDROGEN FLUORIDE

Stuart T. Hadden, Woodbury, N. J., assignor to Socony-Vacuum Oil Company, Incorporated, a corporation of New York Application June 22, 1945, Serial No. 600,873

6 Claims. (Cl. 260—683.4)

This invention relates to a process for the catalytic alkylation of low boiling isoparaffins by reaction with low boiling olefins in the presence of liquid hydrogen fluoride. More specifically, the invention contemplates conducting said alkylation reaction on trays of novel design in apparatus of the general nature of a fractionating column.

As now practiced commercially, hydrogen fluoride alkylation of isobutane with butenes and the like employs a contactor of expensive design to effect the reaction. An emulsion of liquid hydrogen fluoride and liquid hydrocarbons including both reactants and reaction products is circulated within the contactor to provide a contact time on the order of 10 to 15 minutes or greater. Since the reaction is exothermic, heat of reaction must be abstracted to maintain the desired reaction temperature. This is accomplished by means of indirect heat exchange elements in the contactor. Indirect heat exchange of this type is notoriously inefficient and the requirements of the unit for cooling medium and agitation are very large. A portion of the circulating emulsion is continuously withdrawn from the contactor and passed to a settler, being replaced by fresh reactants and acid catalyst. Acid settled out in the settler is recycled to the contactor, at least a portion being passed through equipment for regeneration by removal of water and accumulated heavy polymers.

The hydrocarbon layer is transferred to elaborate fractionating equipment for preparing the product for use as aviation fuel. One element of this fractionating setup is an isobutane column to yield relatively pure isobutane for recycling to the reactor. The high proportion of isobutane to olefin in the charge to the contactor (normally 5 to 1 or greater) places a heavy load on the isobutane column for recovery of unreacted isobutane to be reused in the process. Since a high reflux ratio prevails in this column, its construction and operating cost are very sizeable items in the cost of the product. As pointed out in the prior co-pending application of Thomas P. Simpson, Serial No. 559,733, filed October 21, 1944, it is possible to combine the functions of the isobutane column and the contactor in a single piece of equipment only a little more expensive than the presently known isobutane tower alone. This combination of functions not only eliminates equipment heretofore believed necessary, but in addition I am able to employ a novel method of abstracting heat of reaction by cooling means in the nature of condensers at a point remote from the actual reaction zone. The removal of heat by condensation of vapors is vastly more efficient than indirect heat transfer to cool a liquid phase, it being possible to use smaller equipment and to utilize more fully the available cooling effect of plant cooling water.

A further highly important advantage of the invention lies in the fact that by use of the present invention, alkylation is carried out at a point at which there is inherently a very high proportion of isoparaffins, a condition favorable to alkylation in that it tends to suppress undesirable side reactions such as polymerization.

In its preferred embodiments, my invention also contemplates incorporation of an acid settler and an acid stripper in the same apparatus as the reactor and deisobutanizer, still without greatly increasing its original or operating costs above that of presently-used isobutane columns. My invention also permits—because of its simple and efficient temperature control features—utilization of the advantages accruing from introduction of the reactant charge at temperatures above the reaction temperature maintained in the reactor as disclosed and claimed in the co-pending application Serial No. 490,487 filed June 11, 1943, by Arlie A. O'Kelly and Jacob R. Meadow. My invention also contemplates vapor phase introduction of reactants as described and claimed in application Serial No. 481,430, filed April 1, 1943, by Harry G. Doherty and Arlie A. O'Kelly. It will be readily seen that either of these expedients greatly increases the heat transfer load imposed on the system, yet the increased cooling is readily accomplished according to my invention.

In essence the invention contemplates conducting the reaction on bubble trays of novel design and refluxing vapors from the reaction trays to provide cooling of the actual reaction zone by direct contact of reactants and catalyst with cool liquid consisting of hydrocarbons and catalyst. The novel bubble trays of this invention include a fresh feed inlet, and are arranged for baffling vapors from the next lower tray to be mixed with the fresh feed in a zone isolated from the liquid of the lower tray and thus act to inhibit contact between fresh feed for a reaction tray and the liquid of the next lower tray, whether the latter be also a reaction tray or a tray of more conventional function below the reaction section. When such contact is permitted, either with the body of liquid on a tray or the liquid spray thereabove, there is a tendency to dissolve olefins of the feed in condensed hydrocarbons, which have been depleted of olefins by alkylation. Solution of olefins in the condensed hydrocarbons is undesirable because the contacting of liquids is less intimate than that of vapors, hence liquid phase alkylation does not favor high quality product.

The objects and advantages of the invention will be more clearly understood from the description below of preferred embodiments of the invention, apparatus for which is shown in the annexed drawings, wherein:

Figure 2 is a sectional elevation of part of the reaction section showing two designs of reaction trays for accomplishing the purposes of the invention;

Figure 3 is a view similar to that of Figure 2, showing a different type of trays for the reaction section;

Figure 4 is a plan view of a preferred embodiment of reaction tray design;

Figure 5 is a section on line 5—5 of Figure 4;

Figure 6 is a plan view of a vapor injector for the tray of Figures 4 and 5; and Figure 7 is a section on line 7—7 of Figure 6.

Figure 1:
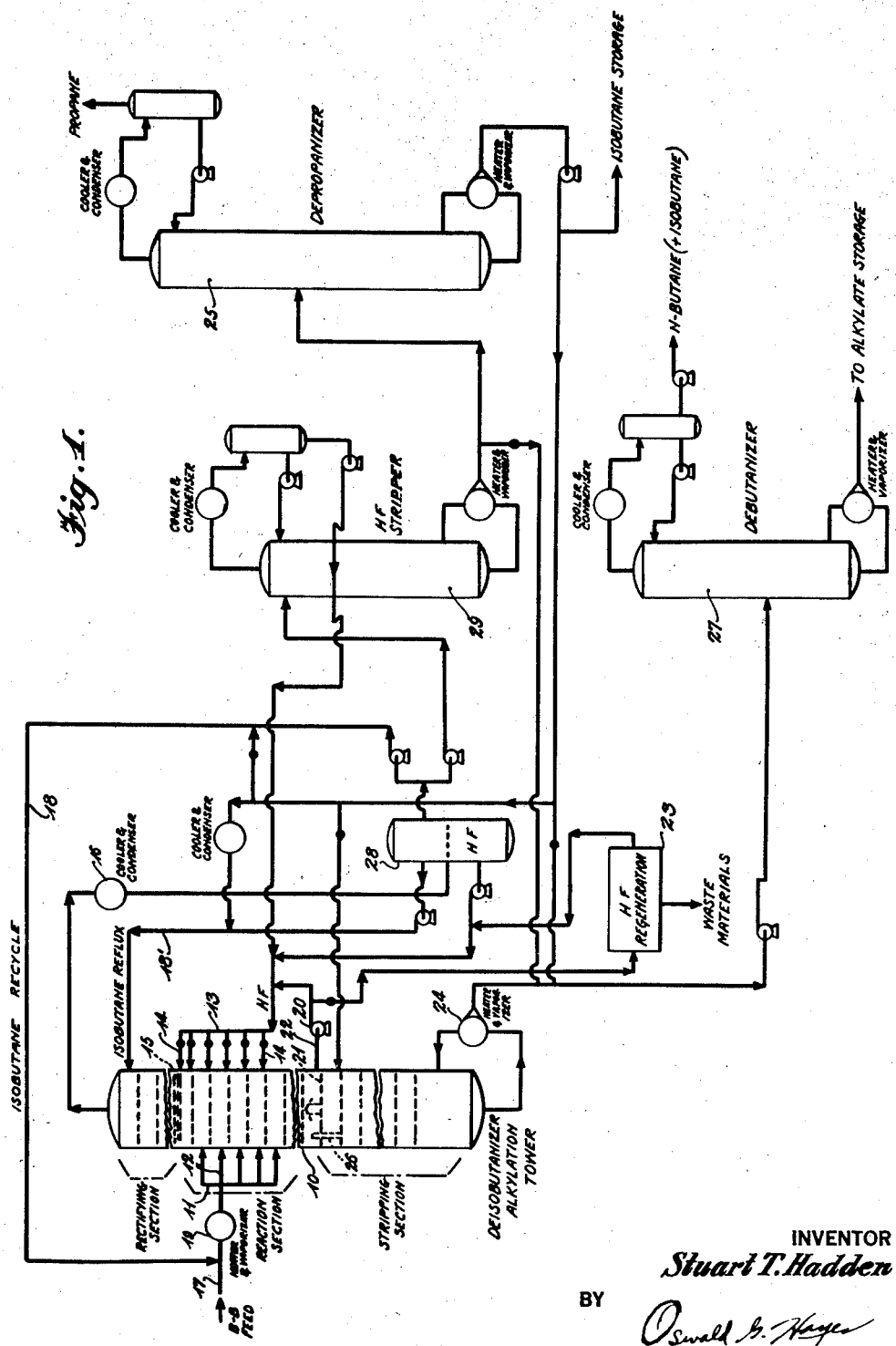
Figure 1 is a diagrammatic representation of apparatus for practicing the invention.

As shown in Figure 1, the principal apparatus element employed in practice of the invention is a bubble tower 10, preferably of at least fifty plates. Of these plates, the upper section—say, three to ten plates—functions as a rectifying section and the bottom section—say, about thirty or more plates—acts as stripper. Between the rectifying section and the stripping section is a reaction section, which may advantageously include about one to five plates or more if the particular conditions of operation warrant. This arrangement is very simple in construction and operation, since control of conditions in the reaction section is accomplished by adjustment of a relatively few elements of high thermal efficiency external to the actual zone of reaction. Thus, cooling of the reaction zone is accomplished by isobutane reflux, the heat being actually abstracted from the system by a condenser instead of the much less efficient cooling coils employed in presently used liquid phase apparatus. Heat is derived, if needed, from the stripping section by rising vapors which condense in the reaction zone. As the description proceeds it will be clearly seen how heat exchange in the process of this invention is accomplished largely, if not solely, by condensation and evaporation; steps capable of handling high heat loads simply and efficiently.

Taking as a typical example the reaction of isobutane with butenes in the presence of hydrogen fluoride to produce a product suitable for use in aviation gasoline, a fresh charge containing isobutane and butenes is supplied in the vapor phase, preferably superheated, to the vapor space below the trays in the reaction section by manifold 11 and inlets 12. Superheating is advantageous in that it prevents any condensation of vapors rising from the plate below and the consequent solution of olefins from the feed by the droplets so formed, the same being carried to the plate below. Superheating is particularly desirable for installations where the trap tray is designed so that no vaporization occurs thereon because under these circumstances there is a temperature drop of about 30° F. from the top stripping tray to the lowest reaction tray.

On the reaction trays is a body of liquid through which passes a vapor mixture admitted by the bubble caps or orifices on the trays. A very high ratio of isobutane to butenes is maintained on the trays by reason of the isobutane reflux from the rectifying section thereabove. Hydrogen fluoride in liquid phase is supplied from manifold 13 by inlets 14 and/or spray head 15. This hydrogen fluoride and the isobutane recycle also serve to cool the reaction section by removing heat of reaction as well as heat of condensation of vapor phase reactants and/or sensible heat of preheated reactants. The said cooling is accomplished by evaporation of isobutane and hydrogen fluoride, the resulting vapors passing up into the rectifying section and out the top of the column where they are condensed in condenser 16 and collected in decanting accumulator 28. The hydrogen fluoride layer is returned to the reaction zone through manifold 13 while the isobutane layer is returned to the column normally as reflux through line 18'. Part of the isobutane layer may be returned as recycle feed through line 18. Introduction of the isobutane layer as reflux serves to effect the desired rectification, provides the desired concentration of this reactant in the reaction zone and removes the heat of reaction from the tower. Return of the isobutane as recycle feed serves to provide the desired proportion of this reactant in the reaction zone without increasing the load on the reboiler. Provision for these alternate methods of returning the isobutane layer to the tower thus increases the flexibility of the process.

An important advantage of the present invention lies in the simplicity of control of process variables and the flexibility of the process in that respect. The ratio of hydrocarbons to catalyst and the effective residence time, i. e., the period during which hydrocarbon reactants are in contact with acid catalyst may be effectively controlled by the feed rates and the height of dams on the bubble trays. The feed rate of any given substance includes not only the fresh material introduced by the manifolds 11 and 13 but also liquids from the rectifying section and vapors from the stripping section. The residence time on any given reaction plate may be held to a few seconds by the controls mentioned above. If very short residence times are desired, a trap-out tray may be inserted between each two adjacent reaction plates and the residence time thus held to the time for one plate. Such trap trays may be external to the column in order to avoid introduction of hydrogen fluoride vapor to the reaction trays.

An unusual feature of the present invention is that it provides for several points of contact between acid and hydrocarbons in a system where the general flow of hydrocarbons and acid is concurrent. It will be noted that vapors of isobutane and such lighter hydrocarbons as may be in the feed or formed as by-products will rise from tray to tray. Even here there is a concurrent flow of hydrogen fluoride. Some alkylate components also probably are carried up with the vapor, but the net effect is to pass the predominant portion of alkylate together with a major portion of the hydrogen fluoride downwardly as liquid to a trap-out tray 21 on which the mixture separates into an acid phase withdrawn at 22 for recycling, with or without regeneration in a conventional unit 23, and a hydrocarbon fraction passed downward to the stripping section. As noted above, the trap tray 21 may be external to the column in order to reduce or eliminate hydrogen fluoride vapors in the vapor rising to the reaction tray. As the alkylation product, containing n-butane and higher boiling hydrocarbons passes through the stripper section, dissolved hydrogen fluoride, isobutane and other light hydrocarbons are removed and returned as vapor to the reaction section. Heat to operate the stripping section is supplied by reboiler 24 which also functions, when desirable, to supply heat by rising vapors from the bottom section to the reaction section.

The alkylate product is passed to fractionation and purification equipment where its initial boiling point is adusted by removal of light constituents and the remainder fractionated to separate the alkylate into desirable products such as aviation alkylate or motor fuel and higher boiling components. A portion of the isobutane from the top of the column is preferably passed to a depropanizer 25 wherein $C_3$ hydrocarbons and lighter are separated and rejected from the system.

Referring to the flow sheet in greater detail, fresh charge, for example, a butene-butane mixture supplied by line 17 admixed if desired with recycled isobutane from isobutane recycle line 18, is passed through a heater 19, from which heated vaporous charge passes to manifold 11. Each of the inlets 12 admits charge vapor to the vapor space below a reaction tray in the reaction section of the tower where the charge mixes with vapors rising in the tower and passes through bubble caps or orifices on the reaction tray to agitate. At the same time, hydrogen fluoride in liquid phase is admitted to the reaction trays from manifold 13. This hydrogen fluoride, together with liquid hydrogen fluoride flowing to each tray from above, serves to catalyze the alkylation reaction. On each tray there is a separation of vapor and liquid, the latter spilling over the dam as a mixture of acid, alkylate and light hydrocarbons to pass to the next lower tray. Vapors passing upwardly will comprise isobutane, normal butane, acid vapor and a minor quantity of alkylate.

The liquid phase mixture of acid and alkylate passing down through the reaction section will contain lighter hydrocarbons such as isobutane because the separation in the reaction section is not sharp. Normal butane will also exist in both phases but the tower is preferably so operated that a major portion of the normal butane in the system is withdrawn with the alkylate. The liquid phase from the lowermost reaction tray passes to trap-out tray 21, within the column or external thereto on which it is maintained relatively quiet and stratifies to produce a lower acid layer which is withdrawn by pump 20 and an upper hydrocarbon layer which passes by downcomer 26 to the stripping section. In the stripping section, acid and isobutane will be largely removed from the alkylate which is then transferred to a column 27 in which light constituents, e. g. butane and such isobutane as may remain in the alkylate, are separated from the alkylate product.

The acid layer discharged from pump 20 is recycled to the manifold 13 or diverted to acid regeneration unit 23 from which purified catalyst is returned to the system. Preferably a portion of the discharge of pump 20 is continuously diverted for regeneration.

The overhead from tower 10 is condensed in condenser 16 and transferred to a settler 28. The upper hydrocarbon layer furnishes reflux for the rectifying section of tower 10 and the lower layer is withdrawn and recycled to acid feed manifold 13. A portion of the upper layer from settler 28 may be recycled through line 18 to fresh feed line 17 and another portion is sent to stripping column 29 wherein dissolved acid is removed and recycled to the alkylation zone of tower 10. Bottoms from stripper 29 are transferred to depropanizer 25 for removal of propane and the remaining isobutane may be returned to the system as recycle to feed or reflux to tower 10. If circumstances warrant, bottoms from stripper 29 or depropanizer 25 or both may be diverted in whole or part to the alkylate stream to debutanizer 27.

In a typical operation, charging isobutane and butene to produce motor fuel and aviation alkylate, the tower is operated at 103 pounds per square inch gauge and a temperature of 120°–121° F. in the reaction section. The ratio of isobutane to butenes in the reaction section is approximately six to one when the top tray of the tower is at 108° F. (condenser temperature, 100° F.) and the bottom tray at 182° F. (reboiler 241° F.). The feed vapor is preheated to 150° F. before charging to the reaction section.

This general scheme of alkylation is that described in the application of Thomas P. Simpson referred to above. According to the present invention, operation of the process is improved by the use of plates of novel design which effectively baffle vapors passing upwardly from tray to tray with addition of fresh charge to vapor substantially free of spray and introduction of the vaporous mixture to the next higher reaction tray. By this means, I avoid the abstraction of olefins from the vapor phase charge by solution in drops of spray which would cause a part of the olefin to be subjected to liquid phase alkylation upon falling back into the lower tray.

In Figure 2, the reaction section includes trays for retaining a fairly deep body of liquid, say ten to twelve inches or more in depth, with provision for introducing vapor phase feed through small holes in the bottom of the tray. The tray is made up of a vessel 31 having perforations in the bottom as shown and supported from the walls of the column by webs 32 and 33 which also serve as the bottoms of troughs defined by downflow weir 34 and overflow weir 35. Spaced about the vessel 31 is cup-shaped baffle 36 into which fresh feed is introduced to be mixed with vapors substantially free of spray from the next lower tray. Liquid flow from tray to tray downward in the reaction section is accomplished by means of downcomers 37 which are of such length that the hydrostatic head of liquid therein is greater than the pressure drop of vapors between adjacent trays.

The two trays shown in Figure 2 differ in the manner in which the vaporous fresh feed is introduced. In the case of the upper tray, a perforated circular pipe 38 supplies feed from a feed line 39 to the space between the vessel 31 and the baffle 36. This fresh feed mingles with vapors free of spray from the next lower tray and the mixture is introduced to the acid catalyst through the perforations in the bottom of vessel 31. In order that the apparatus may be readily drained of acid catalyst when shut down, weep holes 40 are provided at points where bodies of acid might be held up.

The lower tray of Figure 2 is arranged for introduction of fresh feed from line 39 to the bottom of cup-shaped baffle 36. In order to insure adequate mixing of fresh feed with vapors from the next lower tray, baffles 41 are interposed below the perforated bottom of vessel 31. Upon shutting the unit down, acid may be drained from the bottom of baffle 36 by opening valve 42.

Turning now to Figure 3, the invention may be practiced on plates of more conventional design, having bubble caps which differ from those normally used in fractionation equipment in their height. The bubble caps 43 are made high to permit of the use of tall chimneys 44 coacting with the plate 45 to baffle vapors rising from the next lower plate to inhibit carry over of liquid spray to the point of fresh feed introduction. The fresh feed is supplied by tubes 46 projecting well into chimneys 44 from line 39. Thus the possibility of liquid hydrocarbons dissolving olefins from the feed to drop back to the lower tray and be alkylated in liquid phase is avoided. An overflow weir 47 and a web 48 form a trough for supply of liquid to downcomer 37, the bottom of which empties into a baffle 49 to prevent entry of vapors from the lower tray into the downcomer. As in Figure 2, weep holes 40 are provided to permit drainage of acid when the unit is shut down.

The alkylation reaction occurring under conditions described above, namely bubbling vapor phase charge up through a body of acid catalyst, proceeds better if the charge includes an excess of the isoparaffin reactant. Normally, I prefer to operate with an excess of that reactant in the fresh feed introduced, but that excess need not be great, since the mixing of fresh feed with vapors from the lower tray according to my invention will give a reasonably uniform charge mixture in which the isoparaffin is present in large excess. The acid bodies employed on the trays should be quite deep compared with usual fractionating practice, said ten to twelve inches or more.

A particularly advantageous form of reaction tray is shown in Figures 4 to 7, inclusive, which comprises a high chimney supplying vapors for an orifice plate. As shown, the plate is made to rest on a flange in the column. A metal gasket ring 50 is affixed to the periphery of a plate 51 through which passes a downcomer 52 and a chimney 53. A cap 54, orifice plate 55 and circular wall 56 define a vapor space above the plate 51 and about the chimney 53 from which the vapor phase alkylation charge is introduced by injectors 57 to the deep body of catalyst on the tray.

The said injectors 57 are preferably formed to provide a number of orifices each and are threaded as shown to engage tapped holes in the orifice plate 55. Vapors from below the orifice plate 55 enter a central bore 58 in each of the injectors and are passed by a plurality (seven in the form shown) of orifices 59 into the body of catalyst.

I claim:

1. In a process for the catalytic alkylation of isoparaffins by reaction with olefins in the presence of liquid hydrogen fluoride in a fractionating column by introducing a fresh feed of isoparaffins and olefins below at least one tray in a reaction section of said column intermediate the upper and lower trays thereof, refluxing vapors from said reaction section in a refluxing section of said column above said reaction section and returning reflux liquid therefrom to said reaction section, stripping liquid from said reaction section in a stripping section of said column below said reaction section and returning vapors therefrom to said reaction section; the improvement which comprises baffling vapors rising in the column immediately below each tray in the reaction section to disengage liquid spray from the next lower tray, mixing fresh feed with the said baffled vapors to thereby produce a substantially uniform feed mixture and introducing said feed mixture to a body of acid on said tray as a vapor substantially free of liquid containing substantially all the olefins of said fresh feed mixed with baffled vapors as aforesaid.

2. The process of claim 1 wherein said isoparaffin is isobutane and said olefin is butene.

3. In a process for alkylation of vaporized isoparaffins with vaporized olefins by maintaining a deep body of liquid hydrogen fluoride within a reaction zone, introducing vapors of said isoparaffins and said olefins to the lower part of said body, maintaining conditions of temperature and pressure in said reaction zone such that alkylation products will be predominantly liquid and unreacted isoparaffins will be evaporated from said body together with a portion of said hydrogen fluoride, refluxing vapors from said body and returning liquid from said refluxing to said body to cool the same, return evaporated hydrogen fluoride and maintain a high ratio of isoparaffins to olefins in said zone, continuously withdrawing liquid from said body, settling said withdrawn liquid to produce an acid phase and a hydrocarbon phase, returning hydrogen fluoride from said acid phase to said body, fractionally distilling said hydrocarbon phase to produce a vapor therefrom containing hydrogen fluoride and light hydrocarbons and introducing said vapor to said body with said vapors of isoparaffins and olefins; the improvement which comprises baffling said vapor from said hydrocarbon phase to disengage liquid spray, mixing fresh feed containing isoparaffins and olefins therewith and introducing the resultant mixture to said body as aforesaid.

4. In a process for alkylation of vaporized isoparaffins with vaporized olefins by maintaining a plurality of shallow superposed bodies of liquid hydrogen fluoride within a reaction zone, introducing vapors of said isoparaffins and said olefins to each of said bodies, maintaining conditions of temperature and pressure in said reaction zone such that alkylation products will be predominantly liquid and unreacted isoparaffins will be evaporated from each of said bodies together with a portion of said hydrogen fluoride, introducing vapor from each of said bodies below the uppermost to the body next thereabove with said vapors of isoparaffins and olefins, continuously withdrawing liquid from each of said bodies above the lowermost and passing said liquid to the body next therebelow, refluxing vapors from said uppermost body and returning liquid from said refluxing to said uppermost body to cool the same, return evaporated hydrogen fluoride and maintain a high ratio of isoparaffins to olefins in said uppermost body, whereby similar advantageous results are achieved in bodies therebelow by reason of liquid passed downwardly as aforesaid, continuously withdrawing liquid from said lowermost body, settling liquid so withdrawn to produce an acid phase and a hydrocarbon phase, returning hydrogen fluoride from said acid phase to said bodies, fractionally distilling said hydrocarbon phase to produce a vapor therefrom containing hydrogen fluoride and light hydrocarbons and introducing said vapor to said lowermost body with said vapors of isoparaffins and olefins; the improvement which comprises baffling said vapor from said hydrocarbon phase to disengage liquid spray, mixing fresh feed containing isoparaffins and olefins therewith and introducing the resultant mixture to said body as aforesaid.

5. A method of operating a bubble tower to conduct therein an alkylation reaction between isobutane and butenes in the presence of liquid hydrogen fluoride on reaction trays between rectifying trays in the upper portion and stripper trays in the lower portion of said tower, comprising maintaining said reaction trays at conditions of temperature and pressure to maintain hydrocarbons of higher boiling point than isobutane substantially in the liquid phase and to evaporate isobutane, baffling vapors rising in the tower immediately below each of said reaction trays, mixing the baffled vapors with isobutane and butenes, injecting the resultant mixture into the acid on each of said reaction trays, supplying liquid hydrogen fluoride to said reaction trays, removing isobutane vapor from above said rectifying trays, condensing at least a portion of said isobutane and returning the condensed isobutane to said rectifying trays as reflux, settling liquid at a point in said tower between said reaction trays and said stripper trays to form an acid layer and a hydrocarbon layer, recycling said acid layer to said reaction trays, passing said hydrocarbon layer downward to said stripper trays, withdrawing condensate from below said stripper trays, evaporating a portion of said condensate, and returning a portion of said vapors to stripper trays in the lower part of said tower.

6. The process of claim 1, characterized in that said isoparaffin is isobutane and said olefins are butenes.

STUART T. HADDEN.

REFERENCES CITED

The following references are of record in the file of this patent:

UNITED STATES PATENTS

| Number | Name | Date |
|---|---|---|
| 2,311,144 | Wickham | Feb. 16, 1943 |
| 2,380,010 | Arnold | July 10, 1945 |
| 2,173,452 | Merley | Sept. 19, 1939 |
| 2,365,426 | Molique | Dec. 19, 1944 |
| 2,317,241 | Ackerman | Apr. 20, 1943 |
| 2,378,040 | Schulze | June 12, 1945 |
| 2,378,439 | Schlesman | June 19, 1945 |